F. P. WARREN.
Frying Pan.

Patented Feb. 13, 1872.

Witnesses
J. Rowley
H. E. Miles

Frederic Pelham Warren

F. P. WARREN.
Frying Pan.

No. 123,753.   Patented Feb. 13, 1872.

UNITED STATES PATENT OFFICE.

FREDERIC PELHAM WARREN, OF EAST COURT COSHAM, GREAT BRITAIN.

IMPROVEMENT IN FRYING-PANS.

Specification forming part of Letters Patent No. 123,753, dated February 13, 1872.

I, FREDERIC PELHAM WARREN, of East Court Cosham, in the county of Hants, Kingdom of Great Britain and Ireland, have invented certain "Improvements in Frying-Pans," of which the following is a specification:

The invention consists in combining vessels in pairs to form double pans, consisting of two pans, having deep flanges, hinged to and fitting each other, or capable of being otherwise attached and held together, so that the fish or other food to be cooked may be placed with the liquid material between, and the double pan turned over upon the fire, so as to cook its contents at either side, as required, without the liquid being spilled.

In the drawing, Figures 1, 3, and 5 are sections, and Figs. 2, 4, and 6, plan views, showing various forms in which my improved pan may be made.

The pan $a$ is formed of thin metal, with channels $b$ communicating with each other by means of the circular channel $b'$, thus presenting a much smaller amount of surface to the fish or other food to be cooked than is presented by the flat surface of an ordinary frying-pan, and greatly lessening its chance of adhesion to the pan, while at the same time the boiling of the heated grease contained in the channels $b$ effects the cooking of the food in the most thorough and equable manner, without any danger of burning, although the extent of surface presented to the action of the fire is considerably greater in this case than where the ordinary flat surface only is employed.

The pan is a double one, the outer one, $a$, being shown in section, and the other, $a'$, fitting into the pan $a$, being represented in elevation. The pans are formed with deep sides or flanges and with channels $b$ $b'$, as described with reference to the previous figures. The two pans, $a$ and $a'$, each provided with a handle, $d$, are hinged together at $e$, the pan $a'$ fitting into the pan $a$, as shown.

In use, the two pans are opened or divided by means of their hinge, and the food to be cooked is introduced between them. They are then closed, and the food is cooked by placing the combined pan upon the fire and turning it over, so as to cook at either one or the other of the two sides, as required.

Fig. 5 represents a vertical section of a double pan having its channels $b$ made angular in section. The two pans are hinged together at $e$.

Figure 1:
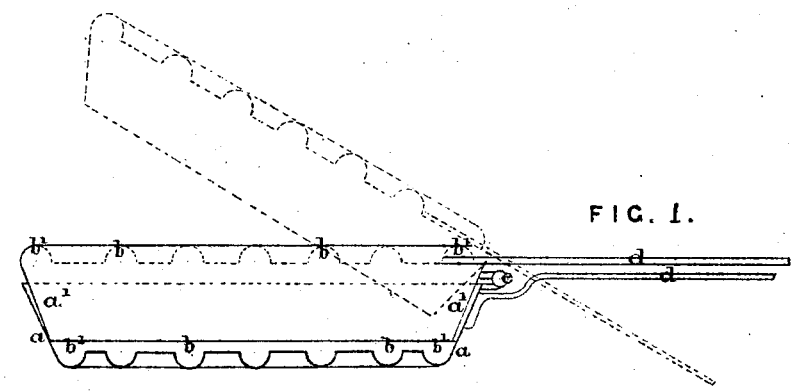
Figure 2:
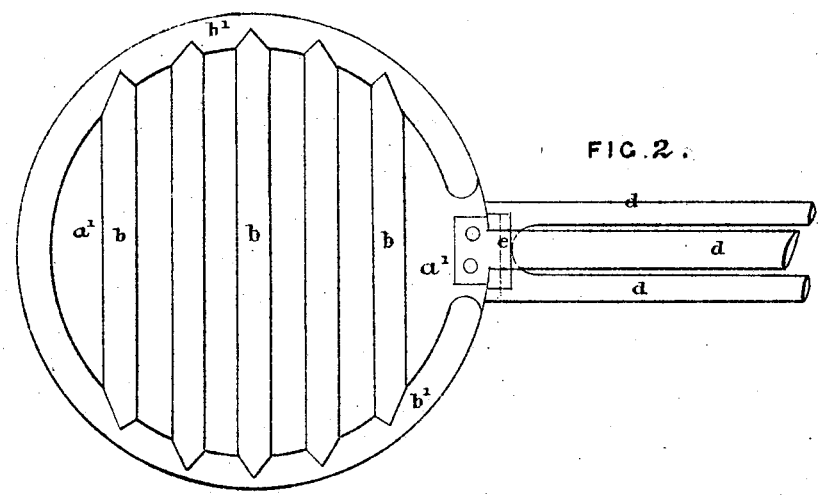
Figure 3:
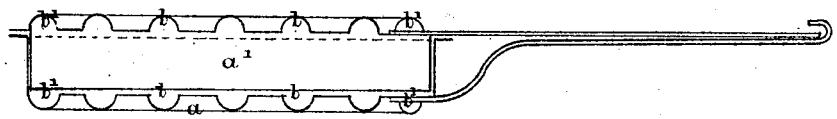
Figs. 3 and 5 represent a modified arrangement of the double pan, in which the two pans, instead of being hinged together, are each formed with a separate handle, and are taken apart for the purpose of introducing the food between them, as required. Transverse as well as longitudinal channels $b$, communicating with the channel $b'$, are employed.
Figure 4:
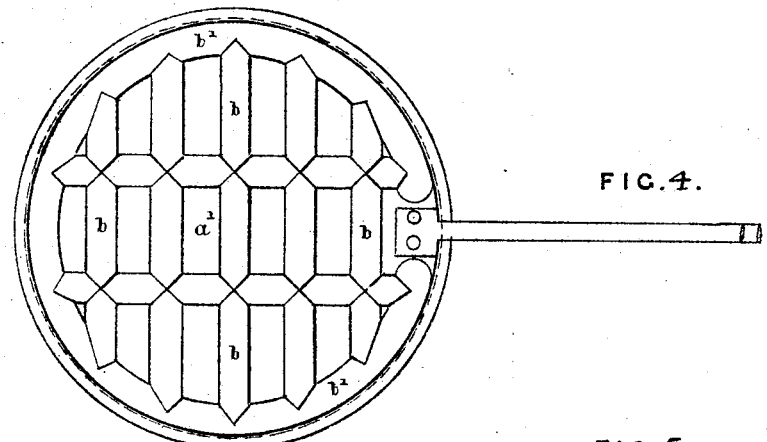
Figure 5:
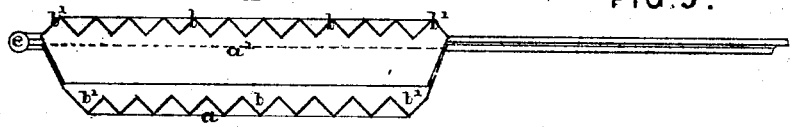
Figure 6:
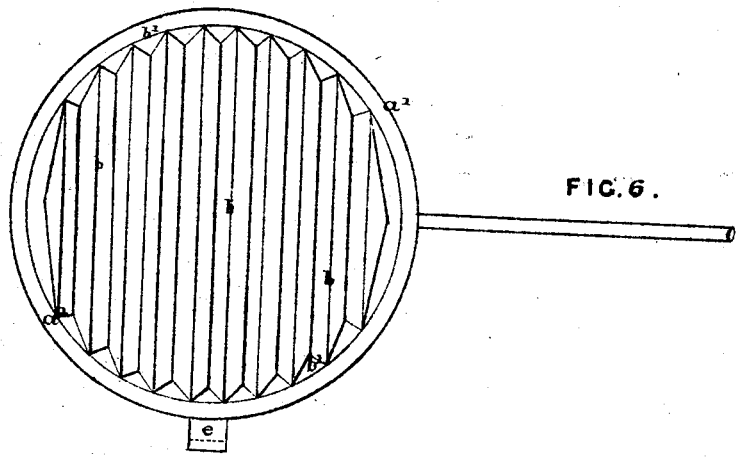
Fig. 6 represents a double pan, in which the hinge $e$, connecting the two pans together, is placed at right angles to the direction of the handles.

I am aware that corrugated waffle and broiler plates hinged together have been used; and, therefore, I do not claim, broadly, a double hinged cooking utensil; but

I claim—

1. A cooking utensil, consisting of two flanged vessels, provided with handles and adapted to each other, as set forth.

2. The combination of two vessels, as set forth, when corrugated as described.

FREDERIC PELHAM WARREN.

Witnesses:
  H. E. WILES,
  JNO. GEO. PEARSON.